(12) United States Patent
Hielscher et al.

(10) Patent No.: US 9,102,081 B2
(45) Date of Patent: Aug. 11, 2015

(54) METHOD AND APPARATUS FOR GENERATING PARTICLES

(71) Applicant: Dr. Hielscher GmbH, Teltow (DE)

(72) Inventors: Harald Hielscher, Stahnsdorf (DE);
Thomas Hielscher, Stahnsdorf (DE);
Holger Hielscher, Teltow (DE)

(73) Assignee: Dr. Hielscher GmbH, Teltow (DE)

( * ) Notice: Subject to any disclaimer, the term of this patent is extended or adjusted under 35 U.S.C. 154(b) by 210 days.

(21) Appl. No.: 13/682,863

(22) Filed: Nov. 21, 2012

(65) Prior Publication Data

US 2013/0147074 A1 Jun. 13, 2013

Related U.S. Application Data

(60) Provisional application No. 61/562,111, filed on Nov. 21, 2011.

(51) Int. Cl.
*B29B 9/16* (2006.01)
*B01J 2/02* (2006.01)
*B29B 9/10* (2006.01)
*B29B 9/12* (2006.01)

(52) U.S. Cl.
CPC ... *B29B 9/16* (2013.01); *B01J 2/02* (2013.01); *B29B 9/10* (2013.01); *B29B 2009/125* (2013.01); *B29B 2009/165* (2013.01)

(58) Field of Classification Search
None
See application file for complete search history.

(56) References Cited

U.S. PATENT DOCUMENTS

| | | | | |
|---|---|---|---|---|
| 4,623,307 | A * | 11/1986 | Froeschke | 425/8 |
| 5,256,362 | A * | 10/1993 | Goto et al. | 264/13 |
| 5,744,074 | A * | 4/1998 | Stouffer et al. | 264/8 |
| 6,638,619 | B1 * | 10/2003 | Brunner et al. | 428/402 |
| 2010/0288005 | A1 * | 11/2010 | Schromm et al. | 71/28 |
| 2011/0016742 | A1 * | 1/2011 | Anderson et al. | 34/287 |

* cited by examiner

*Primary Examiner* — Mary F Theisen

(57) ABSTRACT

A method and an apparatus for generating particles are provided. The method may be a method for generating particles from a flowable medium, the method involving forming drops from the flowable medium, arranging the drops on a particle forming surface and solidifying the drops, thereby forming the particles. The apparatus may be an apparatus for generating particles from a flowable medium with a drop generator and a particle forming surface, the drop generator being formed to arrange drops on the particle forming surface and the particle forming surface may be adapted to contact the drops when the particles are being formed.

15 Claims, 3 Drawing Sheets

METHOD AND APPARATUS FOR GENERATING PARTICLES

RELATED APPLICATION

This application claims the benefit of priority under 35 USC §119(e) of U.S. Provisional Patent Application No. 61/562,111 filed Nov. 21, 2011, the contents of which are incorporated herein by reference in their entirety.

TECHNICAL FIELD

This patent application generally relates to a method and an apparatus for generating particles.

BACKGROUND

It is known to generate particles, e.g. by sputtering or by an electric arc. The known methods and the known apparatuses for performing these methods are, however, complex and cost-intensive in operation, in particular if small-sized or even nano particles are to be generated.

OBJECT

In view of these disadvantages of the known methods and apparatuses for generating particles, an object of the invention is to provide a method and an apparatus for generating particles, which are less complex and cost-intensive.

DETAILED DESCRIPTION

The object is achieved by a first implementation of the method mentioned in the beginning, wherein the method may comprise generating particles from a flowable medium, the method involving forming drops from the flowable medium, arranging the drops on a particle forming surface and solidifying the drops, thereby forming the particles. Furthermore, the object is achieved by a first implementation of the apparatus mentioned in the beginning, the apparatus being an apparatus for generating particles from a flowable medium, with a drop generator for forming drops from the flowable medium, and with a particle forming surface, the drop generator being formed to arrange the drops on the particle forming surface and the particle forming surface being adapted to contact the drops when the particles are being generated.

These simple solutions provide that particles can be generated by forming drops from a flowable medium and solidifying these drops at least partly while they are in contact with the particle forming surface. Forming drops from the flowable medium and generating the particle from the drops is easy to achieve in a cost-extensive manner.

In particular, forming small-sized drops from a flowable medium is less complicated and less expensive than generating particles by sputtering or by an electric arc and methods for forming particles from the flowable medium are easier to perform than controlling sputtering parameters or electric arc discharges. Furthermore, the size of the particles to be generated may easily be adjusted by adjusting the size of the drops formed from the flowable medium.

The solutions can be combined as desired and further improved by the following embodiments of implementations that are advantageous on their own in each case.

Forming drops from the flowable medium may be achieved by atomizing the flowable medium. Atomizing the flowable medium in order to form the drops is less complicated than e.g. sputtering and may for instance be performed by spraying the flowable medium through a nozzle. Drops formed by atomizing may be very small in diameter, resulting in small-sized particles. The generated particles may have a diameter between 1 nm and 500 µm, for instance between 1 nm and 100 µm and e.g. a diameter of 20 µm. The drops may be comparable to the particles in size.

The flowable medium may be a fluid, e.g. a liquid, a condensate, a solution, an emulsion, a dispersion, a suspension or a molten solid body, e.g. ice or a body that is solid at ambient temperature, like 20° C.

When spraying the flowable medium through a nozzle for atomizing the fluid, the resulting drop and, hence, particle size cannot easily be controlled or even changed. A method, with which the drop size can easier be controlled and possibly even changed is a method, which comprises treating the flowable medium with ultrasonic for atomizing the fluid. Using a treatment of the flowable medium with ultrasonic compared to spraying for atomizing the fluid furthermore provides a better control of a drop forming rate.

For atomizing the flowable medium, the drop generator may comprise a nozzle and a pump for pressurizing and spraying the flowable medium. In order to better control drop size and drop forming rate, the drop generator may in a preferred implementation comprise an ultrasonic generator that contacts a volume for atomizing the flowable medium in an ultrasonic conductive manner.

The drops may solidify at least partially by increasing their viscosity, by decreasing of the concentration of at least one component of the flowable medium, e.g. a solvent like water, oil or alcohol, or by changing their phase, e.g. by consolidation, drying, crystallization, hardening, polymerisation or freezing.

After forming the drops, the drops may flow in the air while solidifying. When flowing in the air, the position of the drops cannot be controlled. Thus, drops may collide with each other, thereby forming larger drops, which, in turn, form bigger particles. These bigger particles may have a diameter that is bigger than a desired particle diameter.

A position of the drops can be better controlled, when the drops are arranged on a particle forming surface before the drops solidify. The particle forming surface may be adapted such that the drops may not freely move, thereby avoiding or at least reducing the risk of collisions with other drops.

In order to avoid or at least reduce the risk of collisions of the drops arranged on the particle forming surface, the particle forming surface may comprise at least one drop separation barrier for separating the drops from each other. Hence, the particle forming surface may be adapted to isolate the drops from each other when arranged on the particle forming surface.

For instance, a drop separation barrier may repel water or oil, such that drops may not flow or roll over the drop separation barrier. Furthermore, the drop separation barrier may be formed as a protrusion, e.g. a rib for confining a single drop, the protrusion being arranged on a plane section of the particle forming surface. Moreover, the drop separation barrier may be formed by an edge of an indentation in the plane section of the particle forming surface for keeping a drop at selected places, hence for keeping the drop from freely moving over the particle forming surface. The particle forming surface may comprise a plurality of drop separation barriers.

In order to solidify, at least a part of the drops may vaporize. The solidification of the drops may be accelerated and/or the result of the solidification may be influenced by thermally treating the drops for solidifying.

Furthermore, vaporization of a component of the drops may be influenced by changing ambient pressure around the drops. Hence, the ambient pressure around the drops may be changed for solidifying the drops. For instance, the ambient pressure may be reduced and may in particular be below normal atmospheric pressure while the drops solidify.

In order to influence the solidification of the drops by thermally treating the drops, the apparatus may comprise a tempering device for changing the temperature of the drops.

The tempering device may directly or indirectly interact with the drops. For instance, the tempering device may change the temperature of a gas surrounding the drops, the gas emitting or absorbing thermal energy to or from the drops, thereby heating up or cooling down the drops.

According to another possible implementation, the tempering device may be adapted to change the temperature of the particle forming surface. The particle forming surface may contact the drops with a better heat conductivity compared to a gas that is in contact with the drops. Hence, directly heating up or cooling down the particle forming surface more efficiently changes the temperature of the drops compared to heating up or cooling down the gas.

By heating up the drops, vaporization of at least one component of the drops may be accelerated in order to faster solidify the drops and form the particles. When cooling down the drops, the particles may be formed by freezing the drops.

Often, particles with a ball or spherical shape are to be generated. When drops are arranged on a surface, the form of the drops may deviate from the spherical form. In order to provide a method and an apparatus for generating ball-shaped or spherical particles, the particle forming surface may be adapted to contact the drops with a contact angle of more than 100 degrees, for instance with a contact angle between 100 degrees and 180 degrees, more particular with a contact angle between 160 degrees and 180 degrees and for instance with a contact angle of 170 degrees. The larger the contact angle, the better the form of a drop resembles a ball or sphere. The particles generated from such drops may be ball or sphere shaped or a hollow sphere or a cylinder, e.g. a tube.

The particle forming surface may be treated and in particular coated with a coating to achieve the intended contact angle. The particle forming surface may in particular be hydrophobic, very hydrophobic or preferably superhydrophobic. Alternatively, the particle forming surface may be oleophobic, very oleophobic or preferably superoleophobic.

The more hydro- or oleophobic the particle forming surface, the bigger the contact angle. In particular water-based flowable media may be used for generating spherical particles in combination with the hydrophobic, very hydrophobic and preferably superhydrophobic particle forming surfaces. Oil-based flowable media may be used in combination with the oleophobic, very oleophobic and preferably superoleophobic particle forming surface in order to generate spherical particles.

For improving the spherical shape of the particles, the drops may be moved relative to the particle forming surface during solidification. At least a section of a surface of the drops may at least timely loose contact with the particle forming surface during movement of the drops. For instance, the drops may roll over the surface.

The apparatus may comprise a drop motion creator that is adapted to move the drops. The drop motion creator may be adapted to deform the particle forming surface in order to move the drops relative to the particle forming surface due to gravitational acceleration. The deformation of the particle forming surface may be easily performed, if the particle forming surface is arranged on a deformable sheet, e.g. a conveyer belt. Instead of deforming the particle forming surface, it may be easier to tilt the particle forming surface. Hence, the motion creator may comprise a tilting device for tilting the particle forming surface, thereby causing gravitational acceleration of the drops.

In another possible implementation, the apparatus may comprise a blower for generating a gas stream that is directed at the particle forming surface. On the one hand, the blower may influence solidification of the drops, e.g. by accelerating vaporization of at least one component of the drop. In order to increase the vaporization, the blower may generate a gas stream with a higher temperature than the temperature of the drops. Alternatively, the gas stream may be cooler than the drops, in order to e.g. freeze the drops. On the other hand, the blower may generate a gas stream for moving the drops relative to and in particular on the particle forming surface. The gas stream for moving the drops may optionally be a heated up or cooled down gas stream.

Atomizing a flowable medium drastically increases its surface. Media with a big surface react with other elements to a bigger extent compared to the same medium with a smaller surface. In order to avoid chemical reactions, in particular with oxygen, while forming the drops or the particles, the apparatus may comprise a gas-tight chamber, in which at least the particle forming surface of the apparatus is arranged. The gas-tight chamber may enclose a controlled atmosphere and may e.g. be filled with an inert gas while the particles form.

Alternatively, the gas-tight chamber may be a pressure chamber and the apparatus may furthermore comprise a pump for changing a pressure in the pressure chamber. While forming the drops and/or solidifying the drops to generate the particles, a vacuum, i.e. a gas pressure that is below atmospheric pressure, may be generated or present in the pressure chamber and at the particle forming surface. By forming the vacuum, at least the amount of oxygen and hence the risk of oxidization is reduced.

BRIEF DESCRIPTION OF THE DRAWINGS

Possible implementations of the invention will be described hereinafter in greater detail and in an exemplary manner using the advantageous embodiments and with reference to the drawings.

The described embodiments are only configurations in which, however, the individual features as described above can be provided independently of one another or can be omitted in the drawings.

DETAILED DESCRIPTION OF THE DRAWINGS

Figure 1:
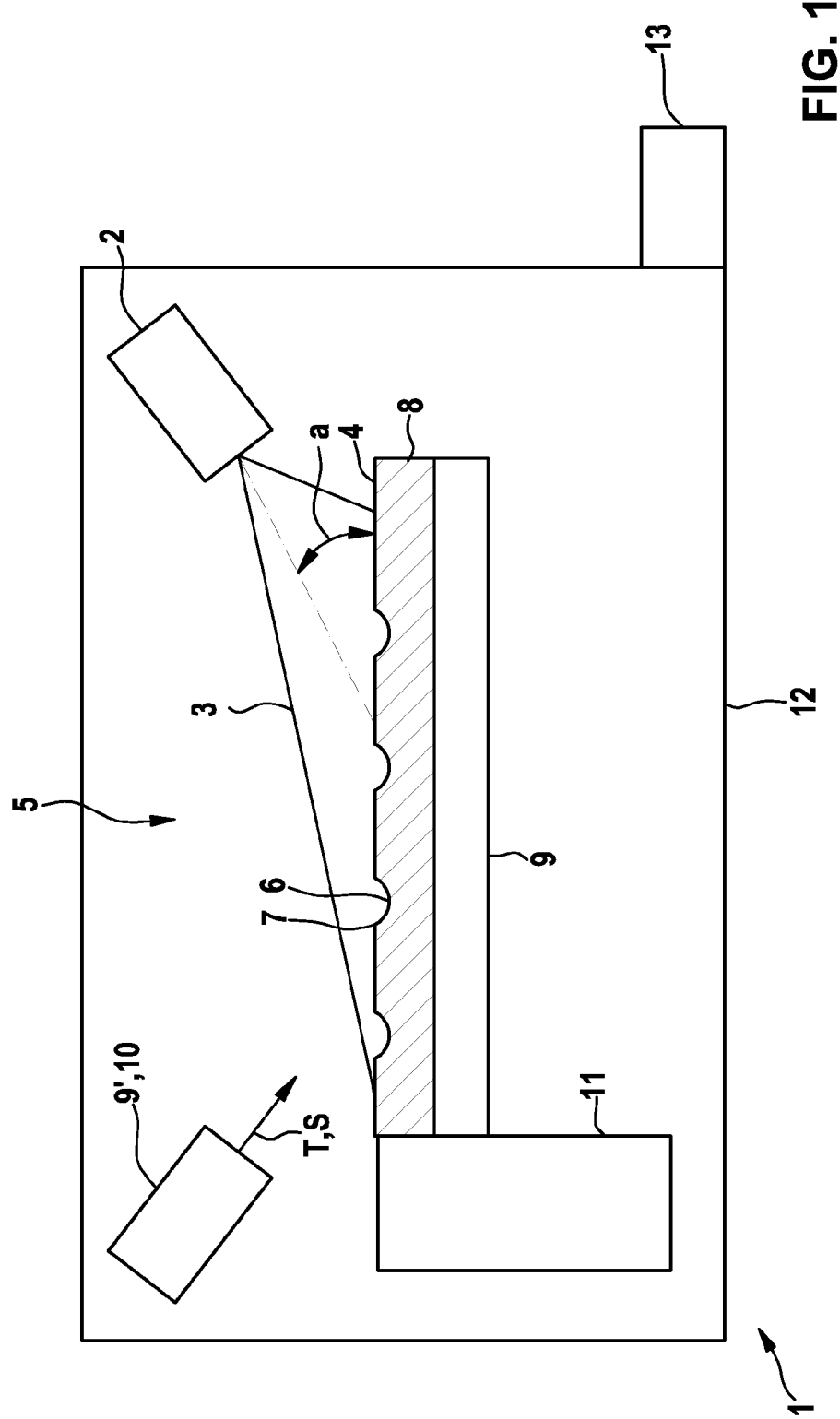
FIG. 1 is a schematic view of an exemplary embodiment of the apparatus for generating particles from a flowable medium.

First, an apparatus 1 for generating particles from a flowable medium will be described with reference to FIG. 1, which shows the apparatus 1 in a cross sectional side view. The apparatus 1 may comprise a drop generator 2 for forming drops from the flowable medium. The drop generator 2 may have a pump for pressurizing the flowable medium and a nozzle for spraying the pressurized flowable medium. Alternatively, the drop generator 2 may comprise an ultrasonic generator that is in contact with a volume for receiving and atomizing the flowable medium, the volume and the ultrasonic generator contacting each other in an ultrasonic-conductive manner. Hence, the flowable medium may be treated with ultrasonic for atomization.

The drop generator 2 may be adapted to arrange atomized flowable medium 3 on a particle forming surface 4. In particular, the drop generator 2 may be aligned such that the atomized flowable medium 3 is directed onto the particle forming surface 4 under an angle that is preferably a sharp or acute angle that is below 90 degrees, in particular below 45 degrees and more particular below 30 degrees or even below 20 degrees.

The particle forming surface 4 may be formed with a drop separation structure 5. The drop separation structure 5 may for instance comprise indentations 6, each of the indentations 6 being adapted to hold a drop of atomized flowable medium 3. In particular, an edge of each of the indentations 6 may thereby provide for a drop barrier 7, which a drop may not readily overcome, once the drop is arranged in the indentation 6.

In the exemplary embodiment of FIG. 1, each of the indentations 6 may have a curved form, that may at least sectionwise be complementary to one of the drops of atomized flowable medium 3. The drops of atomized flowable medium 3 may have a diameter between 1 nm and 50 mm, for instance between 1 nm and 10 mm and in particular 20 μm. The diameter of the drops may be adapted such that particles of solidified drops have a diameter between 1 nm and 50 mm or 1 nm and 10 mm and for instance 20 μm.

The particle forming surface 4 may be arranged on a flexible belt or on a particle forming plate 8, the particle forming plate 8 being ridged.

The apparatus 1 may comprise a tempering device 9 for changing the temperature of the drops, at least while they are arranged on the particle forming surface 4. The tempering device 9 may for instance be adapted to change the temperature of the particle forming surface 4. For changing the temperature of the particle forming surface 4, the tempering device 9 may abut against the particle forming belt or plate 8. In particular, the tempering device 9 may rest against a surface of the particle forming belt or plate 8 opposite of the particle forming surface 4. Hence, the temperature of the drops of atomized flowable medium 3 that are in contact with the particle forming surface 4 is indirectly changed by the tempering device 9 and in particular via the particle forming belt or plate 8.

Alternatively or additionally to the tempering device 9 that is in direct contact with the particle forming belt or plate 8, apparatus 1 may comprise a tempering device 9', that faces the particle forming surface 4. The tempering device 9' may for instance irradiate the particle forming surface 4 with infrared radiation, thereby directly heating the particle forming surface 4 and any drops of atomized flowable medium 3 arranged on the particle forming surface 4. According to another possible embodiment, tempering device 9' may be adapted to blow a gas stream T onto the particle forming surface 4 in order to change the temperature of drops of atomized flow-able medium 3 arranged on the particle forming surface 4. The gas stream T may be heated up or cooled down by the tempering device 9' such that the temperature of the gas stream T is above or below the temperature of the drops of atomized flowable medium 3.

By changing the temperature of the drops, the duration and result of the solidification of the drops may be influenced and in particular the duration may be shortened.

Instead of a tempering device 9', apparatus 1 may comprise a blower 10 that blows an untempered gas stream S onto the particle forming surface 4. Both, the untempered gas stream S and the tempered gas stream T may be adapted to move drops of atomized flowable medium 3 relative to and in particular on the particle forming surface 4.

Using one of the gas streams S, T in order to move the drops of atomized flowable medium 3 on the particle forming surface 4 is complicated, as the gas streams may be turbulent gas streams with unpredictable directions of gas current. In order to better direct motions of the drops of atomized flowable medium 3 on the particle forming surface 4, apparatus 1 may comprise a drop motion creator 11, which may deform the particle forming belt 8. Alternatively or additionally, the drop motion creator 11 may tilt the particle forming belt or plate 8. Tilting or deforming the particle forming plate or belt 8 results in sloped or tilted sections of the particle forming surface 4, such that the drops may be moved due to gravitational influence.

At least the particle forming surface 4 and possibly also the drop generator 2 may be arranged in a gas-tight chamber 12. The gas-tight chamber 12 may be filled with an inert gas or with vacuum, e.g. in order to avoid oxidation of the atomized flowable medium 3. The gas-tight chamber 12 may be a pressure chamber and the apparatus 1 may furthermore comprise a vacuum pump 13 for creating a vacuum in the gas-tight chamber 12.

The flowable medium may be a fluid, e.g. a liquid, a condensate, a solution, an emulsion, a dispersion, a suspension or a molten solid body, e.g. ice, or a molten solid body that is solid at ambient temperature, like 20° C.

The drops may solidify by changing their viscosity, concentration of one of their components, e.g. of a solvent like water, oil or alcohol, or phase, e.g. by consolidation, drying, crystallization or freezing.

The resulting particles are preferably ball-shaped, hollow spheres or e.g. tube-formed cylinders.

Figure 2:
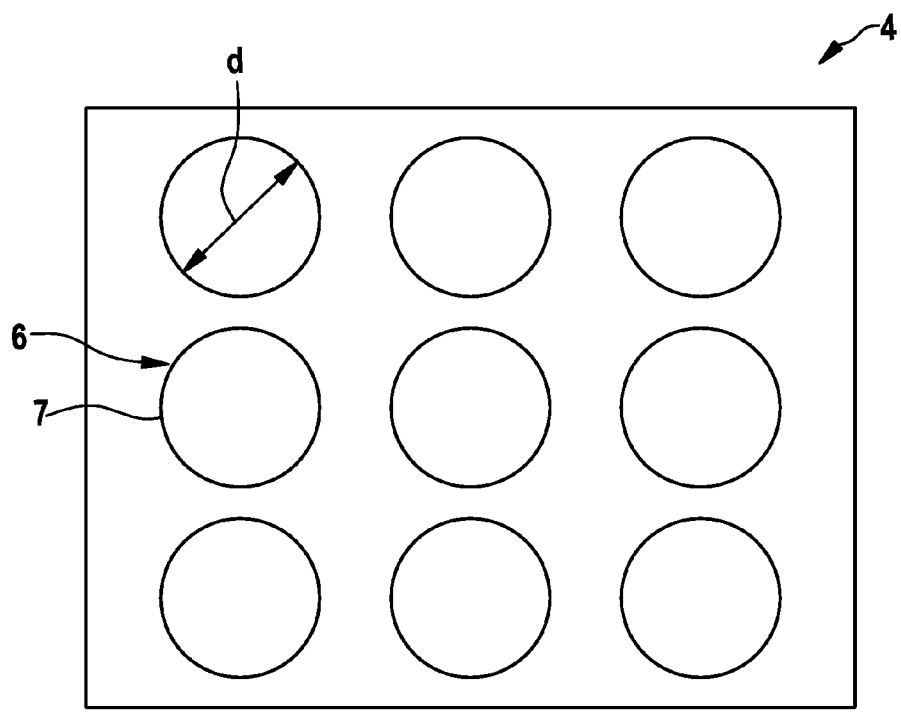
FIG. 2 is a schematic view of a particle forming surface of the embodiment of FIG. 1.

FIG. 2 shows the particle forming surface 4 of the apparatus 1 shown in the exemplary embodiment of FIG. 1 in a top view. The particle forming surface 4 may be provided with a plurality of indentations 6. For sake of clarity, particle forming surface 4 is shown with 9 indentations in FIG. 2. As the drops of atomized flow-able medium 3 and the solidified particles may be very small, e.g. having a diameter of about 20 μm or less, the particle forming surface 4 may comprise more than 9 and in particular up to 100, up to 1000 or even more indentations 6 with a diameter d that is comparable to the diameter of the drops of the particles. Furthermore, the indentations 6 are arranged in a chessboard-like matrix in the exemplary embodiment of FIG. 2. The indentations 6 may be provided in a different arrangement, e.g. if spatial requirements demand a more compact arrangement of the indentations 6.

An edge of each of the indentations 6, at which the indentations 6 adjoin to a planar plateau surface of the particle forming surface 4, forms the barrier 7 for drops of atomized flowable medium 3. The drops may not readily overcome the barrier 7 when being arranged in one of the indentations 6.

Figure 3:
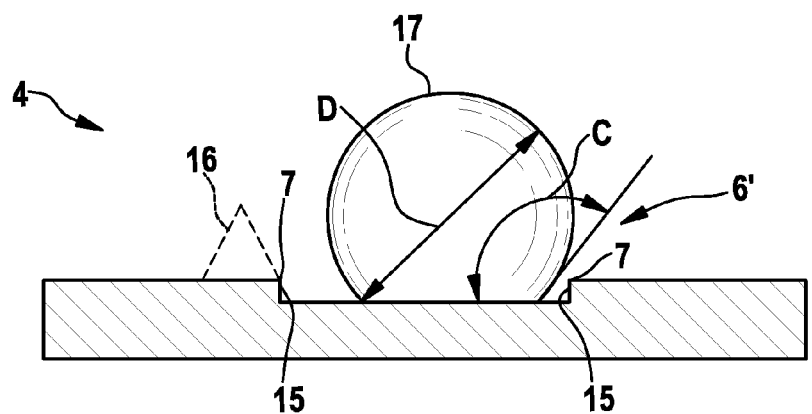
FIG. 3 is a schematic view of another exemplary embodiment of the particle forming surface.
Figure 4:
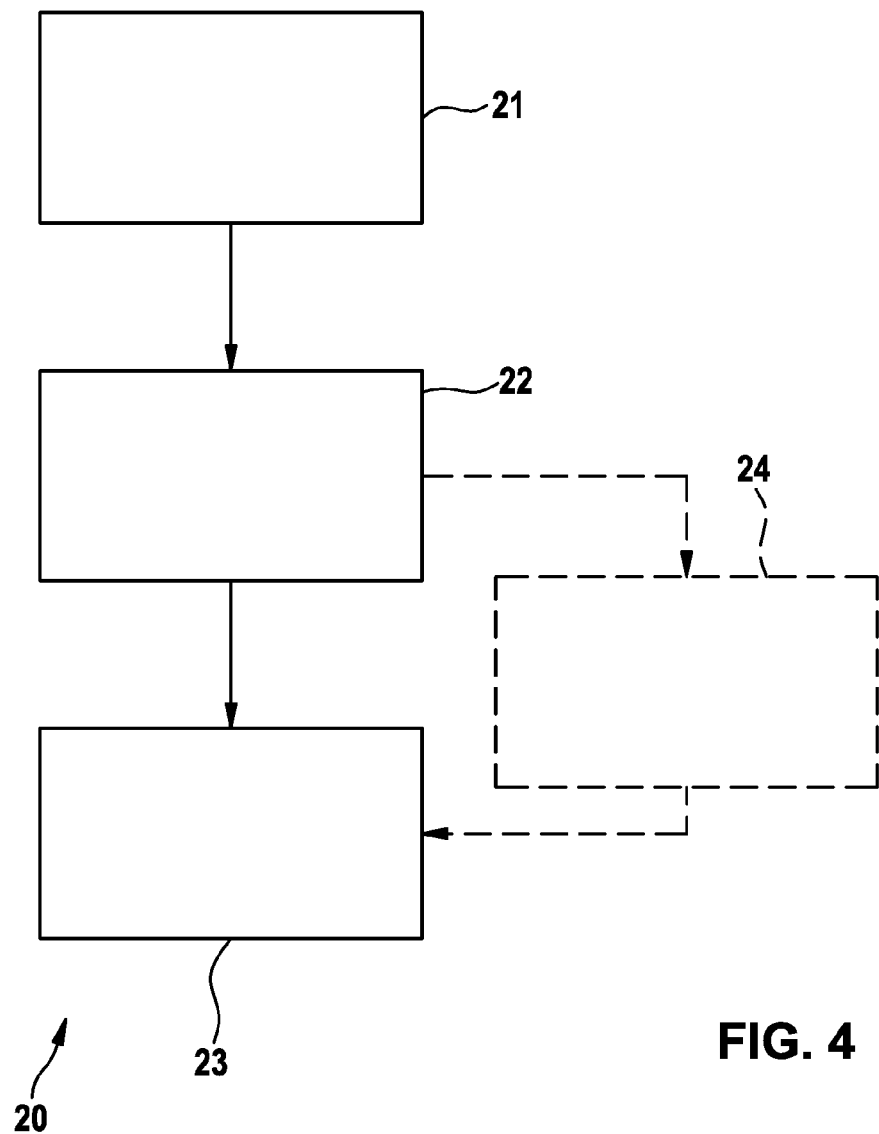
FIG. 4 is a schematic view of the method for generating particles from a flowable medium as a flow chart.

FIG. 3 shows two further alternative embodiments of the particle forming surface 4. Same reference signs are being used for elements, which correspond in function and/or structure to the embodiments of FIGS. 1 and 2. For the sake of brevity, only the differences from the exemplary embodiment of FIGS. 1 and 2 will be looked at.

The exemplary embodiment of FIG. 3 differs from the exemplary embodiment of FIGS. 1 and 2 by the shape of the indentation 6 and of the barrier 7.

For the sake of clarity, only one indentation 6' is shown in FIG. 3. The indentation 6' is shown in a cross-sectional view. In contrast to the indentations 6 of FIGS. 1 and 2, the indentation 6' is not complementary to a ball. Rather, the indentation 6' of FIG. 3 confines a volume that is complementary to a box or a hexahedron. Side walls 15 of the indentation 6' of FIG. 3 form the bather 7. When viewed in the top view of FIG. 2, the indentation of FIG. 6 may appear round like in FIG. 1, or polygonal and e.g. rectangular.

FIG. 3 furthermore shows another possible embodiment of a bather 7, namely a protrusion 16 that protrudes from the particle forming surface 4. The protrusion 16 is shown with a dashed line and may be formed as a rib, which cannot readily be overcome by drops of atomized flowable medium 3. The rib of FIG. 3 has a triangular cross section parallel to the plane of projection. It may be formed with a different cross section and may extend straight or curved over the particle forming surface 4.

The Apparatus 1 may comprise several protruding barriers of protrusions 16, which may form a grid or lattice for confining drops of atomized flowable medium 3 in fields of the grid or lattice and in particular between three, four or more protrusions 16.

In FIG. 3 a drop 17 of atomized flowable medium 3 is shown arranged on the particle forming surface 4. In particular, the drop 17 is arranged in the indentation 6' and between opposite side walls 15 of the indentation 6'. Drop 17 does not contact any of the side walls 15 in the possible embodiment of FIG. 3, in order to display a contact angle C between the drop 17 of atomized flowable medium 3 and the particle forming surface 4. Alternatively, the drop 17 may be in contact with at least one or even both of the side walls 15 during the generation of the particle. The contact angle C is at least 100 degrees and for instance between 160 degrees and 180 degrees and preferably 170 degrees. With such a high contact angle C, drops 17 of atomized flowable medium 3 are almost completely sphere shaped. The bigger the contact angel C, the better the form of the drops 17 resembles a sphere. Hence, with a high contact angle C between the particle forming surface 4 and the drops 17, particles with an almost sphere-like form may be generated.

A diameter D of the drop 17 may be of the same magnitude as a diameter of a particle generated from this drop 17. However, the diameter D may be slightly bigger or smaller than the diameter of the particle.

In order to form drops 17 with a high contact angle C, the particle forming surface 4 may be treated or coated to be hydrophobic, very hydrophobic or even superhydrophobic. Alternatively, the particle forming surface 4 may be treated or formed to be oleophobic, very oleophobic or even superoleophobic. In particular, water-based flowable media may form drops 17 with a high contact angle C on a superhydrophobic particle forming surface 4. Oil-based flowable media may form drops 17 with a high contact angle C, in particular on superoleophobic particle forming surfaces 4.

FIG. 4 shows a first possible embodiment of the method 20 for generating particles from a flowable medium. Same reference signs are used for elements, which in function and/or structure resemble elements of the exemplary embodiments of FIGS. 1 to 3.

In a first step 21 of method 20, drops 17 are formed from a flowable medium, in particular by atomizing the flowable medium. Drop forming step 21 is followed by a second step 22, in which the drops 17 are arranged on a particle forming surface 4. A flow of the drops 17 is preferably directed on the particle forming surface 4 under a small angle and with a low velocity. The angle may be between 0 degrees and 90 degrees, preferably between 0 degrees and 45 degrees and e.g. 25 degrees. The velocity may range from almost 0 to 1 meter per second, preferably, from almost 0 to 0.1 meter per second and e.g. 0.05 meter per second.

After the drops 17 are arranged on the particle forming surface 4, the drops 17 solidify in a third step 23 in order to form the particles.

In an optional step 24, the drops 17 may be thermally treated and/or may be moved before or during the solidification in order to influence the solidification. Alternatively or additionally, a gas, e.g. air, contacting the particle forming surface 4 may be replaced by another gas, e.g. an inert gas, or by vacuum.

What is claimed is:

1. Method for generating particles from a flowable medium, the method involving atomizing the flowable medium to form drops from the flowable medium, arranging the drops on a particle forming surface, and solidifying the drops at least partially thereby forming particles.

2. Method of claim 1, characterized by spraying the flowable medium through a nozzle for atomizing the fluid.

3. Method of claim 1, characterized by treating the flowable medium with ultrasonic for generating atomized flowable medium.

4. Method of claim 1, characterized by arranging the drops on the particle forming surface before solidifying the drops.

5. Method of claim 1, characterized by thermally treating the drops for solidifying the drops.

6. Method of claim 1, characterized by changing ambient pressure around the drops for solidifying the drops.

7. Apparatus for generating particles from a flowable medium, with a drop generator for forming drops from the flowable medium, and with a particle forming surface, the drop generator being formed to arrange the drops on the particle forming surface and the particle forming surface being adapted to contact the drops with a contact angle of more than 100 degrees when the particles are being generated.

8. Apparatus of claim 7, characterized in that the particle forming surface comprises a drop separation barrier for separating the drops from each other.

9. Apparatus of claim 7, characterized by a tempering device for changing the temperature of the drops.

10. Apparatus of claim 9, characterized in that the tempering device is adapted to change the temperature of the particle forming surface.

11. Apparatus of claim 7, characterized by a drop motion creator for moving the drops relative to the particle forming surface.

12. Apparatus of claim 11, characterized in that the drop motion creator comprises a tilting device for tilting the particle forming surface.

13. Apparatus of claim 7, characterized by a blower for generating a gas stream that is directed at the particle forming surface.

14. Apparatus of claim 7, characterized by a gas-tight chamber for providing a controlled atmosphere, the particle forming surface being arranged in the pressure chamber.

15. Apparatus of claim 7, characterized in that the drop generator comprises an ultrasonic generator that contacts a volume for atomizing the flowable medium in an ultrasonic conductive manner.

* * * * *